(12) United States Patent
Schwarz et al.

(10) Patent No.: US 9,964,036 B2
(45) Date of Patent: May 8, 2018

(54) SIMPLIFIED ENGINE BLEED SUPPLY WITH LOW PRESSURE ENVIRONMENTAL CONTROL SYSTEM FOR AIRCRAFT

(71) Applicant: United Technologies Corporation, Farmington, CT (US)

(72) Inventors: Frederick M. Schwarz, Glastonbury, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 106 days.

(21) Appl. No.: 14/120,450

(22) Filed: Jun. 27, 2014

(65) Prior Publication Data
US 2017/0022899 A1   Jan. 26, 2017

(51) Int. Cl.
| | | |
|---|---|---|
| *B64D 13/04* | (2006.01) | |
| *F02C 6/08* | (2006.01) | |
| *F02C 9/18* | (2006.01) | |
| *F02C 7/32* | (2006.01) | |
| *B64D 13/06* | (2006.01) | |

(52) U.S. Cl.
CPC .............. *F02C 6/08* (2013.01); *B64D 13/04* (2013.01); *F02C 7/32* (2013.01); *F02C 9/18* (2013.01); *B64D 2013/0644* (2013.01); *F05D 2220/323* (2013.01)

(58) Field of Classification Search
CPC ........ B64D 13/02; B64D 13/04; B64D 13/06; B64D 13/08; F02C 6/04; F02C 6/08; F02C 6/10; F02C 7/16; F02C 7/18; F02C 7/185; F02C 9/18
See application file for complete search history.

(56) References Cited

U.S. PATENT DOCUMENTS

| | | | | |
|---|---|---|---|---|
| 5,161,364 A | * | 11/1992 | Bruun ................ | B64D 13/04 60/772 |
| 2012/0180501 A1 | * | 7/2012 | Army ................ | B64D 13/08 60/796 |
| 2013/0040545 A1 | * | 2/2013 | Finney ................ | B64D 13/06 454/71 |

(Continued)

FOREIGN PATENT DOCUMENTS

| | | |
|---|---|---|
| EP | 2557038 A2 | 2/2013 |
| EP | 2613035 A2 | 7/2013 |

OTHER PUBLICATIONS

Rauch, D., "Design Study of an Air Pump and Integral Lift Engine ALF-504 Using the Lycoming 502 Core", NASA Report CR-120992, NASA Lewis Research Center, Cleveland, Ohio, 1972, pp. 1-182.*

(Continued)

*Primary Examiner* — Gerald L Sung
*Assistant Examiner* — Rene Ford
(74) *Attorney, Agent, or Firm* — Carlson, Gaskey & Olds, P.C.

(57) ABSTRACT

An environmental control system includes a low pressure tap at a location on a first compressor section of a main compressor section. The low pressure tap communicates airflow to a first passage leading to a downstream outlet. A compressor is driven by an electric motor. A combined outlet intermixes airflow from the first passage and from the compressor driven by the electric motor and passes the airflow downstream to be delivered to an aircraft use.

6 Claims, 2 Drawing Sheets

(56) References Cited

U.S. PATENT DOCUMENTS

2013/0125561 A1* 5/2013 Schwarz .................. F02C 6/00
                                                    60/802
2015/0104289 A1* 4/2015 Mackin ................ F04D 27/023
                                                    415/1

OTHER PUBLICATIONS

Warwick, G., "Civil Engines: Pratt & Whitney gears up for the future with GTF", Flight International, Nov. 2007, accessed on Jul. 17, 2015 at http://www.flightglobal.com/news/articles/civil-engines-pratt-amp-whitney-gears-up-for-the-future-with-gtf.*
Coy, Peter, "The Little Gear That Could Reshape the Jet Engine", Bloomberg Business, Oct. 15, 2015, pp. 1-4 [accessed on Nov. 10, 2015 at http://www.bloomberg.com/news/articles/2015-10-15/pratt-s-purepower-gtf-jet-engine-innovation-took-almost-30-years].*
European Search Report for EP Application No. 15174218.6 dated Nov. 19, 2015.

\* cited by examiner

SIMPLIFIED ENGINE BLEED SUPPLY WITH LOW PRESSURE ENVIRONMENTAL CONTROL SYSTEM FOR AIRCRAFT

CROSS REFERENCE TO RELATED APPLICATION

This application is a continuation in part of U.S. application Ser. No. 13/345,793 filed Jan. 9, 2012, now granted U.S. Pat. No. 8,904,805.

BACKGROUND

This application relates to an environmental control system for an aircraft which taps both high and low pressure compressed air for uses on an aircraft.

Environmental control systems are known, and associated with an aircraft. Typically, these systems tap air from a gas turbine engine on the aircraft, and send it to the aircraft cabin, and other air uses on the aircraft.

The systems typically tap low pressure compressed air from a lower pressure compressor location, and higher pressure compressed air from a higher pressure compressor location. The two are utilized at distinct times during the operation of a gas turbine engine, dependent on the needs, and the available air.

In the prior art, when the higher pressure air is tapped, it is at a very high temperature. Thus, cooling of the air must occur. It is typical that some form of intercooler or other heat exchanger is included.

In addition, the higher pressure compressed air has already been compressed beyond the level of the lower pressure compressed air. The more higher pressure compressed air that is diverted away from engine uses, the lower the efficiency of the engine.

SUMMARY

In a featured embodiment, a gas turbine engine assembly for an aircraft includes a fan section delivering air into a main compressor section. The main compressor section includes a first compressor section and a second compressor section operating at a higher pressure than the first compressor section. The main compressor section compresses air and delivers air into a combustion section where the air is mixed with fuel and ignited to generate products of combustion that are passed over a turbine section to drive the fan section and main compressor sections. An environmental control system includes a low pressure tap at a location on the first compressor section of the main compressor section. The low pressure tap communicates airflow to a first passage leading to a downstream outlet. A compressor is driven by an electric motor. A combined outlet intermixes airflow from the first passage and from the compressor driven by the electric motor and passes the airflow downstream to be delivered to an aircraft use.

In another embodiment according to the previous embodiment, includes a gearbox driven by a fan drive turbine of the turbine section to drive the fan section. The gearbox provides a gear reduction of at least about 2.0.

In another embodiment according to any of the previous embodiments, the turbine section includes first turbine section driving the second compressor section, an intermediate turbine section driving the first compressor section and a third turbine section driving the fan section.

In another embodiment according to any of the previous embodiments, the first compressor section includes at least four (4) stages and no more than eight (8) stages.

In another embodiment according to any of the previous embodiments, bleed air is taken from at least a third stage of the first compressor section.

In another embodiment according to any of the previous embodiments, includes a check valve between the low pressure tap and the combined outlet.

In another embodiment according to any of the previous embodiments, includes a first control valve downstream the low pressure tap for controlling airflow into the compressor driven by the electric motor.

In another embodiment according to any of the previous embodiments, includes a second control valve for controlling airflow to the compressor driven by the electric motor.

In another embodiment according to any of the previous embodiments, includes a controller configured for controlling the first control valve and the second control valve responsive to an overspeed condition of the electric motor.

In another featured embodiment, an environmental control system for an aircraft includes a low pressure tap associated with a location in a main compressor section. The low pressure tap communicates airflow to a first passage leading to a downstream outlet. A second passage is in communication with the low pressure tap and a compressor driven by an electric motor. A combined outlet intermixes airflow from the first passage and from the compressor driven by the electric motor and passing the airflow downstream to be delivered to an aircraft use.

In another embodiment according to the previous embodiment, a check valve is disposed within the first passage associated with the low pressure tap.

In another embodiment according to any of the previous embodiments, includes a first control valve downstream of the combined outlet.

In another embodiment according to any of the previous embodiments, includes a second control valve disposed between the low pressure tap and the compressor.

In another embodiment according to any of the previous embodiments, includes a sensor generating data indicative of a speed of the electric motor and communicating the data indicative of a speed of the electric motor to a controller.

In another featured embodiment, a gas turbine engine assembly for an aircraft includes a fan section delivering air into a main compressor section. The main compressor section includes a first compressor section and a second compressor section operating at a higher pressure than the first compressor section. The main compressor section compresses air and delivers air into a combustion section where the air is mixed with fuel and ignited to generate products of combustion that are passed over a turbine section to drive the fan section and main compressor sections. An environmental control system includes a low pressure tap at a location on the first compressor section of the main compressor section. The low pressure tap communicates airflow to a first passage leading to a downstream outlet and into a third compressor. A combined outlet intermixes airflow from the first passage and from the third compressor and passes the airflow downstream to be delivered to an aircraft use.

In another embodiment according to the previous embodiment, the main compressor includes a low pressure compressor including a plurality of stages and the low pressure tap is disposed after a third stage of the low pressure compressor.

In another embodiment according to any of the previous embodiments, the low pressure tap is disposed before an eighth stage of the low pressure compressor.

In another embodiment according to any of the previous embodiments, includes a motor for driving the third compressor.

Although the different example have specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
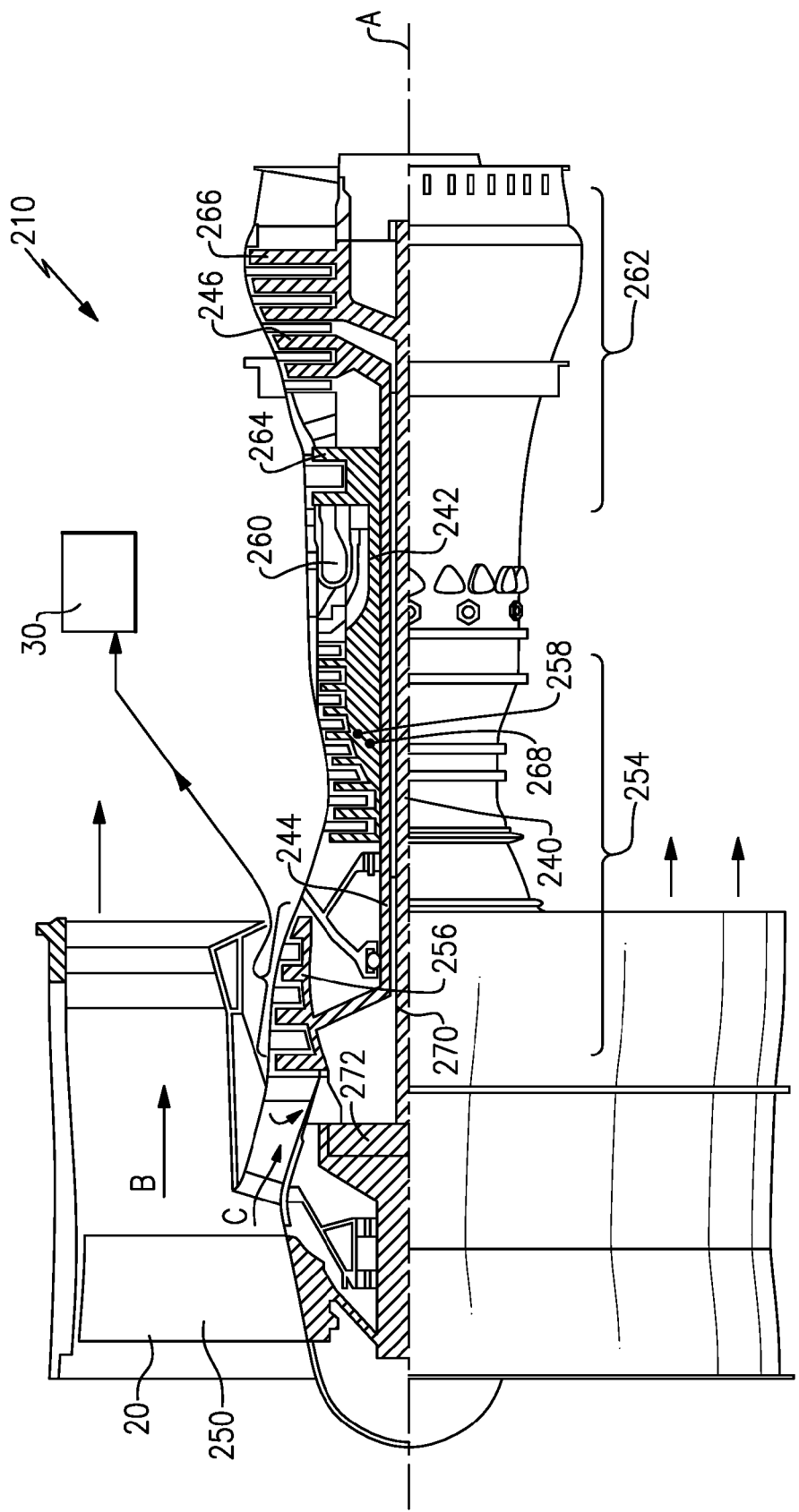
FIG. 1 schematically shows an embodiment of a gas turbine engine.

A gas turbine engine 210 is shown in FIG. 1. As shown, the engine 210 includes a fan 250 (which includes a plurality of fan blades 20), a main compressor section 254 (which includes both a low pressure compressor 256 and a high pressure compressor 258), a combustor 260, and a turbine section 262 (which includes a high pressure turbine 264, an intermediate pressure turbine 246 and a low pressure turbine 266). The high pressure compressor 258 is driven, via a first spool 268, by the high pressure turbine 264. The low pressure compressor 256 is driven, via a second spool through an intermediate shaft 244 coupled to the intermediate pressure turbine 246. The low pressure turbine 266 drives the fan blades 20 of the fan section 250. In this example, the low pressure turbine 266 drives an inner shaft 240 to drive a geared architecture 272 that in turn drives the fan section 250. It should be appreciated, that the low pressure turbine 266 could also directly drive the fan section 250 without the speed reduction provided by the geared architecture 272.

The fan section 250 drives air along a bypass flow path B while the compressor section 254 draws air in along a core flow path C where air is compressed and communicated to a combustor section 260. In the combustor section 260, air is mixed with fuel and ignited to generate a high pressure exhaust gas stream that expands through the turbine section 262 where energy is extracted and utilized to drive the fan section 250 and the compressor section 254.

The intermediate or second spool includes the intermediate shaft 244 that couples the intermediate turbine section 246 to the low pressure (or first) compressor 256. A third spool 270 generally includes the inner shaft 240 that connects the fan 250 to the low pressure (or third) turbine section 266. The low pressure turbine 266 may also be referred to as the fan drive turbine because it drives the fan section 250 either through the geared architecture 272, or through a direct connection. In this disclosed example, the inner shaft 240 drives the fan 250 through a speed change device, such as the geared architecture 272, to drive the fan 250 at a lower speed than the low speed spool 270. The high-speed spool 268 includes an outer shaft 242 that interconnects the high pressure (or second) compressor section 258 and the high pressure (or first) turbine section 264. The inner shaft 240, the intermediate shaft 244 and the outer shaft 242 are concentric and rotate via the bearing systems disposed about the engine central longitudinal axis A.

The disclosed gas turbine engine 210 in one example is a high-bypass geared aircraft engine. In a further example, the gas turbine engine 210 includes a bypass ratio greater than about six (6), with an example embodiment being greater than about ten (10). The example geared architecture 272 is an epicyclical gear train, such as a planetary gear system, star gear system or other known gear system, with a gear reduction ratio of greater than about 2.0.

In one disclosed embodiment, the gas turbine engine 210 includes a bypass ratio greater than about ten (10:1) and the fan diameter is significantly larger than an outer diameter of the low pressure compressor 256. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 250 of the engine 210 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } °\text{R})/(518.7° \text{R})]^{0.5}$. The "Low corrected fan tip speed", as disclosed herein according to one non-limiting embodiment, is less than about 1150 ft/second.

The example low pressure compressor section 256 is driven by the intermediate turbine 246. The example low pressure compressor section 256 includes at least three (3) stages and up to about eight (8) stages. In one disclosed embodiment the low pressure compressor 256 includes at least eight (8) stages.

An environmental control system 30 for use on an aircraft receives air from portions of the main compressor 254. In this example, the ECS system 30 receives air from a portion of the low pressure compressor 256.

Figure 2:
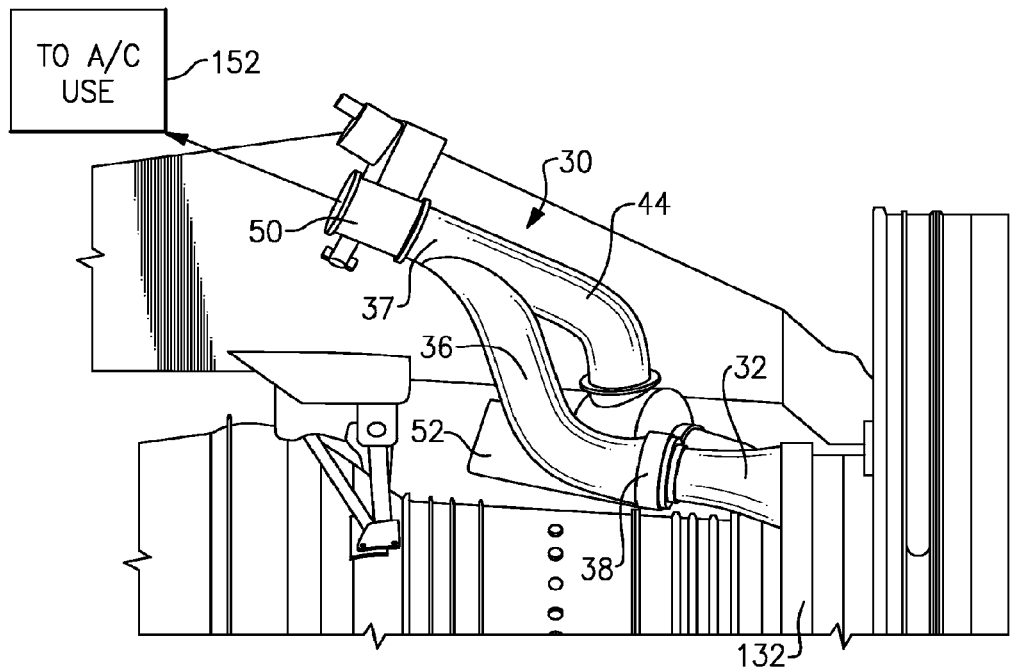
FIG. 2 shows an embodiment of an environmental control system for an aircraft.

Referring to FIG. 2 with continued reference to FIG. 1, the ECS 30 for use on an aircraft is illustrated. A tap 32 is at a lower pressure location 132. Location 132 is from the lower pressure compressor section 256. In one disclosed example the lower pressure location 132 where bleed air is drawn from the low pressure compressor section 256 is after at least a $3^{rd}$ stage. In another example, the tap 32 is located up to aft of the $8^{th}$ stage of the low pressure compressor 256.

Figure 3:
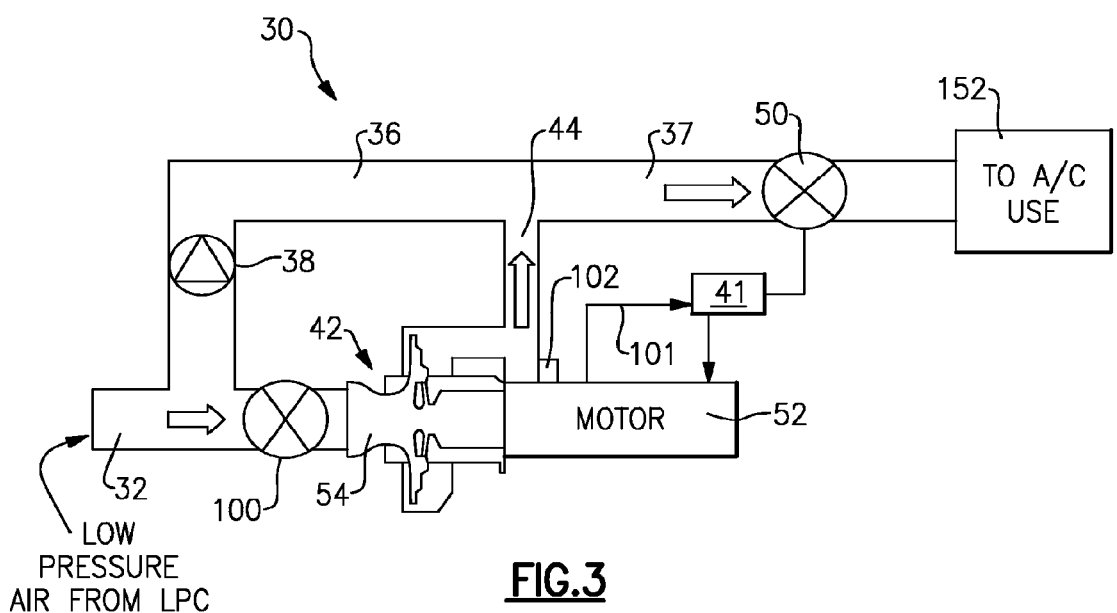
FIG. 3 shows a schematic of the FIG. 2 system.

Referring to FIG. 3 with continued reference to FIG. 2, the tap 32 leads to a first passage 36 having a check valve 38, and also into a compressor section 54 of the turbocompressor 42 driven by an electric motor 52. An outlet 44 of the compressor section 54 merges with the first passage 36 and both pass through a combined outlet 37 to a valve 50 and thereafter to an aircraft use 152. The example electric motor 52 is a variable speed electric motor, but it could also be another kind of motor such as a hydraulic motor, or even a power take-off. An example power take-off could include a shaft driven by one of the spools and includes a clutch for selective engagement.

As shown in FIG. 3, the tap 32 alternatively leads to compressor section 54 or into first passage 36 leading to the combined outlet 37. Check valve 38 allows flow from tap 32 to the first passage 36 in a single direction. It also provides some resistance to flow in that direction.

The electric motor 52 drives the compressor section 54 to compress the air from the tap 32, and increase its pressure. Bleed airflows through the conduit 36 and mixes with compressed airflow from the outlet 44, and pass to the combined outlet 37. When the compressor section 54 is being driven by the electric motor 52, there is suction applied to the first passage 36 and the tap 32, and thus check valve 38 will remain closed.

In one example, bleed air is taken from a stage after a $3^{rd}$ stage of the low pressure compressor 256 and fed to the tap 32. In another example, bleed air is taken at around the $8^{th}$ stage of the low pressure compressor 256. The air from the tap 32 is used generally exclusively under certain conditions when the heat to be rejected is at a maximum. As an example, the air will tend to pass from tap 32 through the check valve 38 to the first passage 36 during climb and cruise. The electric motor 52 is not utilized when the bleed air from the low pressure compressor 256 is sufficient to provide the desired pressure and temperatures for the aircraft use 152. However, under certain conditions, as an example a descent, the electric motor 52 is actuated to drive the compressor section 54. The air from tap 32 passes to the compressor section 54. The valve 50 is a control valve that modulates flow to the aircraft use in response to airflow demands and requirements. The electric motor 54 drives the compressor section 54 to provide the required pressure increase of pressure from airflow from the low pressure compressor 256.

A valve 100 is provided prior to the compressor section 54 and is controlled by controller 41. The valve 100 is actuated to close off flow from the low pressure compressor 256 to control and modulate low pressure airflow into the compressor section 54.

A sensor 102 is provided that generates data indicative of motor speed that is sent by way of communication line 101 to the controller 41. The controller 41 will actuate, and/or close valves 100, 38 and 50 in a desired combination to prevent damage to the system. In one example, the controller 41 will receive information from the sensor 102 indicative of the onset, or actual overspeed condition of the electric motor 52. The controller 41 utilizes at least data from the sensor 102, along with other data available of engine operation to recognize a current or potential overspeed condition that warrants shutdown or other remedial actions.

The reduction in size and capacity elimination of a required fan heat exchanger, or the reduction in its size owing to the reduced temperature of the low pressure bleed and the elimination of air from the higher compression location, is particularly valuable when combined with a system incorporating a gear drive for the turbo fan, such as shown at 272 in FIG. 1.

Although an example embodiment has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine assembly for an aircraft comprising:
a fan section delivering air into a main compressor section, said main compressor section including a first compressor section and a second compressor section operating at a higher pressure than the first compressor section, said main compressor section compressing the air and delivering the air into a combustion section where the air is mixed with fuel and ignited to generate products of combustion that are passed over a turbine section to drive said fan section and main compressor section;
an environmental control system including a low pressure tap at a location on the first compressor section of the main compressor section, wherein the low pressure tap communicates airflow to a first passage leading to a downstream outlet, and a compressor driven by an electric motor;
a first control valve downstream the low pressure tap for controlling the airflow into the compressor driven by the electric motor;
a second control valve for controlling the airflow to the compressor driven by the electric motor;
a combined outlet intermixing airflow from the first passage and from the compressor driven by the electric motor and passing the airflow downstream to be delivered to an aircraft use; and
an electronic controller configured for controlling the first control valve and the second control valve in response to a signal indicative of an overspeed condition of the electric motor.

2. The gas turbine engine assembly as recited in claim 1, including a gearbox driven by a fan drive turbine of the turbine section to drive said fan section, wherein the gearbox provides a gear reduction.

3. The gas turbine engine assembly as recited in claim 1, wherein the turbine section includes a first turbine section driving the second compressor section, an intermediate turbine section driving the first compressor section and a third turbine section driving the fan section.

4. The gas turbine engine assembly as recited in claim 1, wherein the first compressor section includes at least four (4) stages and no more than eight (8) stages.

5. The gas turbine engine assembly as recited in claim 4, wherein bleed air is taken from a third stage of the first compressor section.

6. The gas turbine engine assembly as recited in claim 1, including a check valve between the low pressure tap and the combined outlet.

* * * * *